(12) United States Patent
Xiao et al.

(10) Patent No.: US 6,538,695 B1
(45) Date of Patent: Mar. 25, 2003

(54) ON-CHIP FIXED-PATTERN NOISE CALIBRATION FOR CMOS IMAGE SENSORS

(75) Inventors: Peter Hong Xiao, San Jose, CA (US); Evan Y. Wang, Fremont, CA (US)

(73) Assignee: IC Media Corporation, San Jose, CA (US)

(*) Notice: Subject to any disclaimer, the term of this patent is extended or adjusted under 35 U.S.C. 154(b) by 0 days.

(21) Appl. No.: 09/185,796

(22) Filed: Nov. 4, 1998

(51) Int. Cl.⁷ .......................... H04N 9/64; H04N 5/335; H01L 27/00
(52) U.S. Cl. .................. 348/245; 348/308; 250/208.1
(58) Field of Search .......................... 348/241, 243, 348/245; 378/98.8; 250/208.1

(56) References Cited

U.S. PATENT DOCUMENTS

| | | | |
|---|---|---|---|
| 4,556,910 A | | 12/1985 | Tisue |
| 4,589,028 A | * | 5/1986 | Ochi .......................... 348/241 |
| 4,821,104 A | | 4/1989 | Kondo |
| 5,296,696 A | | 3/1994 | Uno |
| 5,303,064 A | * | 4/1994 | Johnson et al. ............. 358/406 |
| 5,317,407 A | | 5/1994 | Michon |
| 5,434,619 A | | 7/1995 | Yonemoto |
| 5,434,620 A | | 7/1995 | Higuchi et al. |
| 5,514,865 A | * | 5/1996 | O'Neil .................... 250/208.1 |
| 5,541,654 A | | 7/1996 | Roberts |
| 5,633,679 A | * | 5/1997 | Hosier et al. ............... 348/243 |
| 5,724,095 A | * | 3/1998 | Shyu et al. .................. 348/241 |
| 5,925,875 A | * | 7/1999 | Frey ........................ 250/208.1 |
| 5,952,659 A | * | 9/1999 | Yoneyama et al. ......... 250/332 |
| 6,118,115 A | * | 9/2000 | Kozuka et al. ............. 250/208 |
| 6,184,527 B1 | * | 2/2001 | Young ........................ 250/332 |
| 6,320,616 B1 | * | 11/2001 | Sauer ........................ 348/241 |
| 6,344,877 B1 | * | 2/2002 | Gowda et al. .............. 348/245 |

* cited by examiner

*Primary Examiner*—Wendy R. Garber
*Assistant Examiner*—Lin Ye
(74) *Attorney, Agent, or Firm*—Fernandez & Associates, LLP (57) ABSTRACT

An on-chip FPN calibration method and circuits scheme applying a reference voltage signal to an array of calibration pixels coupled to a sensor matrix. Two data values are read from each bit line and used to calculate an offset and a gain error for a pixel column. A reference offset and a reference gain error value are then generated by computing the average offset and the average gain error from the collected offset and gain error values of each bit line. Calibration data for each bit line then comprises an offset difference and a gain error difference, the offset difference comprising the difference between the offset value for that bit line and the reference offset, and the gain error difference comprising the gain error difference between the gain error for that bit line and the reference gain error. The calibration data for each bit line is then stored in on-chip volatile memory and is used later under normal operation to compensate for the FPN effect.

10 Claims, 8 Drawing Sheets

ON-CHIP FIXED-PATTERN NOISE CALIBRATION FOR CMOS IMAGE SENSORS

FIELD OF INVENTION

The present invention relates to complementary metal oxide semiconductor image sensors, and more particularly, to methods for on-chip calibration and correction of fixed-pattern noise.

BACKGROUND OF INVENTION

Complementary metal oxide semiconductor (CMOS) image sensor technology is poised to take over the existing CCD (charge-coupled-device) technology in the market of image and video capture. CMOS technology offers many benefits, such as lower cost, ease of manufacturing, and a higher degree of integration over the CCD. However, a major drawback of the CMOS image sensor technology is the presence of fixed-pattern noise (FPN). This type of noise is generated from a mismatch of circuit structures in the integrated circuits process variations. The effect of FPN is that groups of pixels, typically each column in a sensor array exhibits relatively different strengths in their responses to uniform input light.

To remove the effect of FPN, conventional calibration process involves measuring an output based on a known optical input and comparing it against an expected value. In CMOS image sensors, a white light of known intensity is typically shone onto the sensors and used as the input calibration signal. In principle, if there is no mismatch in the sensor devices, the voltage signal output from every pixel cell should be identical. In reality, significant differences in signal output values are read out between bit lines for the pixel columns of a sensor matrix, even if the same input light stimulus is applied to the matrix. These column differences can be calibrated and stored to be used in the normal FPN correction process. Typically, these difference data are stored separately in a separate, off-chip, non-volatile memory device, and during FPN correction process, the deviation data is then used to compensate each bit line output to produce a corrected pixel output value. However, an external non-volatile memory unit increases cost and provides lower performance to access this off-chip device. Moreover, a non-volatile memory is an expensive component to be integrated on-chip as well. There is therefore a need for a high performance, cost-effective CMOS sensors with minimum FPN.

SUMMARY OF INVENTION

An on-chip FPN calibration method and circuits scheme applies a reference voltage signal to an array of calibration pixels coupled to a sensor matrix. Two data values are read from each bit line and used to calculate an offset and a gain error for a pixel column, the offset being the first data value and the gain error being the slope of the first and second data value read for each bit line. A reference offset and a reference gain error value are then generated by computing the average offset and the average gain error from the collected offset and gain error values of each bit line. Calibration data for each bit line then comprises an offset difference and a gain error difference, the offset difference comprising the difference between the offset value for that bit line and the reference offset, and the gain error difference comprising the gain error difference between the gain error for that bit line and the reference gain error. The calibration data for each bit line is then stored in on-chip volatile memory and is used later under normal operation to compensate for the FPN effect.

DETAILED DESCRIPTION OF PREFERRED EMBODIMENT(S)

Figure 1:
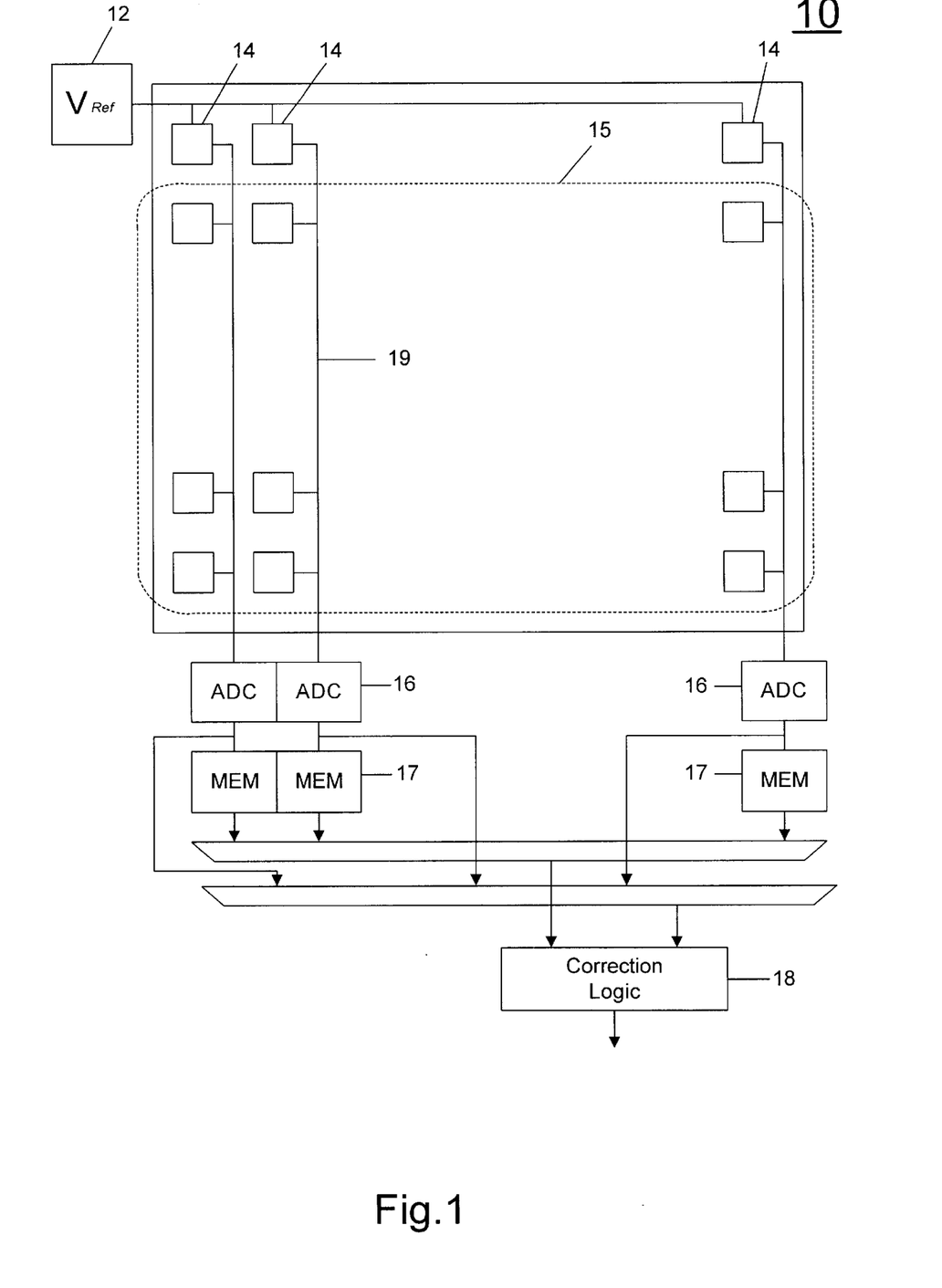
FIG. 1 is a general system-level block diagram of an on-chip FPN image sensor architecture designed in accordance to the principles of this invention.

FIG. 1 illustrates a general system-level block diagram of an on-chip FPN calibration architecture 10 for CMOS image sensors designed in accordance with the principles of this invention. Calibration can be designed to be invoked either at power-on of an image sensor chip, at the activation of a reset signal (RS) at user's control, or otherwise, depending on desired design specifications. As illustrated in FIG. 1, a row of calibration pixel circuits 14 is added to a sensor matrix 15, a calibration pixel circuit 14 is provided for each array of pixels in matrix 15, such as for each column of pixels, wherein each pixel column is coupled to a pixel column output bit line 19. A reference voltage signal 12 (Vref) is applied as input to each calibration pixel 14.

During FPN calibration and correction process, two data values are read out of each calibration pixel 14 from each bit line 19 via ADC circuitry 16 and provided to correction logic 18. Correction logic 18 generates a corresponding offset and a gain error value from the two data values for each bit line and store them into memory 17. A reference offset and gain error value are then generated from the collective offset and gain error values. Accordingly, the reference offset comprises the average offset value of the offset values read from each bit line and the reference gain error value comprises the average gain error value of the gain error values read from each bit-line. Calibration data for that bit line then comprises computing the offset difference between the offset value read for that bit line and the reference offset, and the gain error difference between the gain error value for each bit line and the reference gain error. The resulting offset and gain error difference for each bit line are then stored back into memory as calibration data preferably into on-chip, volatile memory 17, such as registers. This calibration data is then later accessed by correction logic 18 to add back to pixel cell output signal for bit line signal strength correction.

Figure 2:
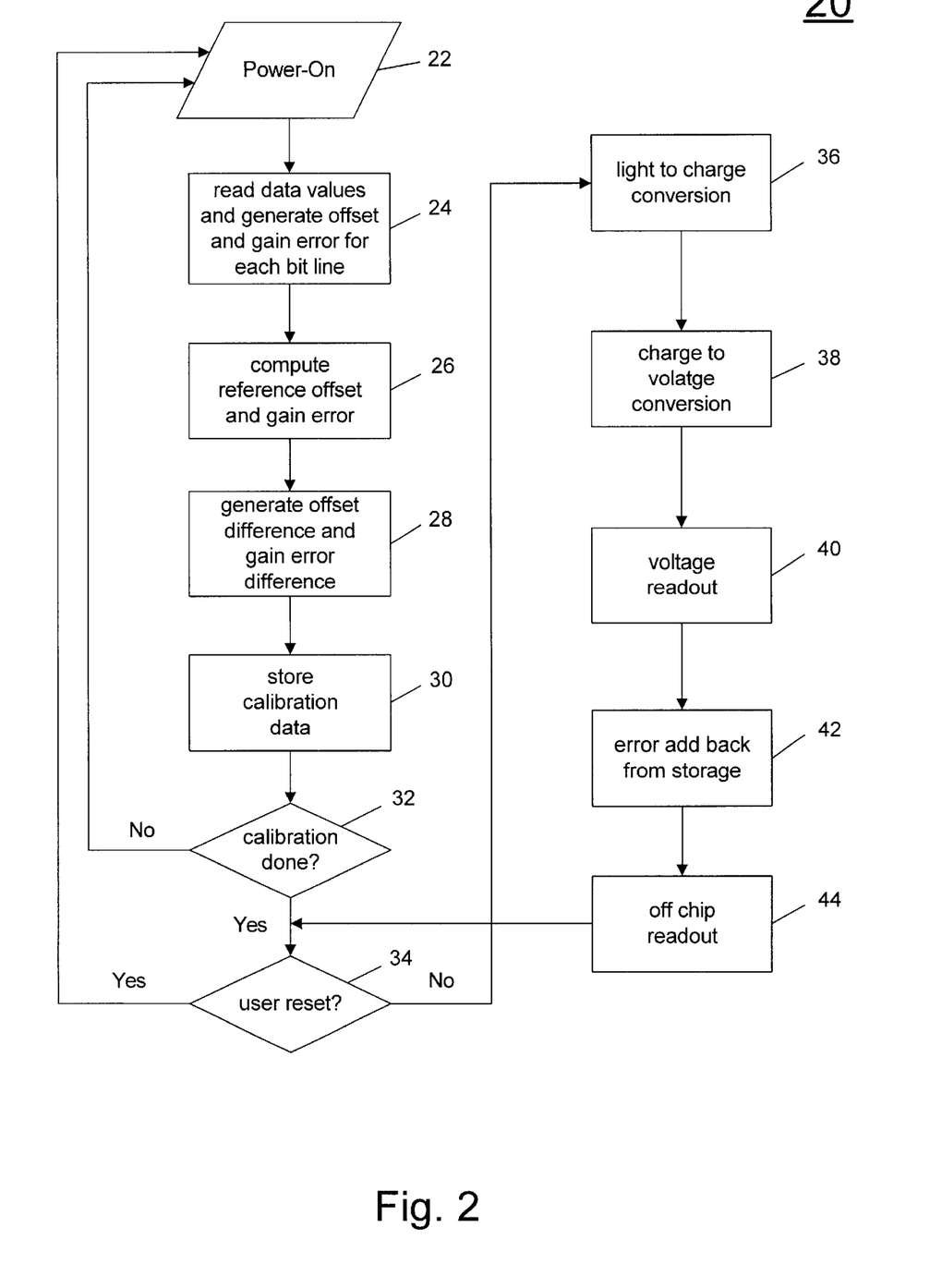
FIG. 2 is a flow chart of operational steps for implementing present image sensor architecture of FIG. 1.

FIG. 2 is a flow chart of operational steps for implementing present, on-chip, FPN calibration for image sensor architecture of FIG. 1. In the preferred embodiment, on-chip FPN calibration method 20 comprises step 22 of initiating the calibration process upon power-on of an image sensor device 10 and applying a reference signal to a plurality of calibration pixels 14. Step 24 comprises reading data values from each bit line and generating a corresponding offset and gain error value for data values of each bit line. Step 26 comprises computing a reference offset and a reference gain error value, wherein the reference offset comprises the average of the collective offset values for all the bit lines, and the reference gain error comprises the average of the collective gain error values for all the bit lines. Step 28 comprises computing the calibration data comprising the offset difference and gain error difference for each bit line. The offset difference comprises the difference between the offset value for a bit line and the reference offset value and the gain error difference comprises the difference between the gain error for a bit line and the reference gain error. The computed calibration data of offset and gain error differences for each bit line are then stored in step 30, preferably into on-chip, volatile memory 17; such as registers.

Step 32 then detects whether calibration is completed for a sensor matrix. In the preferred embodiment, steps 24, 26, and 28 are repeated more than one time, such as, for example, preferably 16 times to generate 16 difference offset and gain error values for each particular bit line. The 16 average offset values stored are then averaged to provide the reference offset, likewise for the 16 average gain error values. The resulting reference offset and gain error value generated in this manner provide better accuracy. Thus, step 22 allows the user an additional flexibility of selecting greater accuracy by increasing the number of repetitions of steps 24, 26, and 28. Once the number of repetition of steps 24, 26 and 28 is satisfied during step 32, process 20 checks in step 34 whether an user reset signal (RS) has been activated. If yes, calibration process 20 routes from step 34 to step 24 to again read out data values from each bit line. If signal RS is not activated, then referring to the typical sensor functional operation, light input received is converted to a charge, and that charge is converted to a pixel output voltage signal that is read out of each bit line during normal sensor operation. Each bit line pixel output voltage signal is read out in step 40, and then in step 42, the previously computed calibration offset difference and gain error difference associated with each particular bit line are then added back to the output pixel signal in step 42. And finally, the corrected output pixel signals provided off-chip, such as to a CPU or a display.

Figure 3:
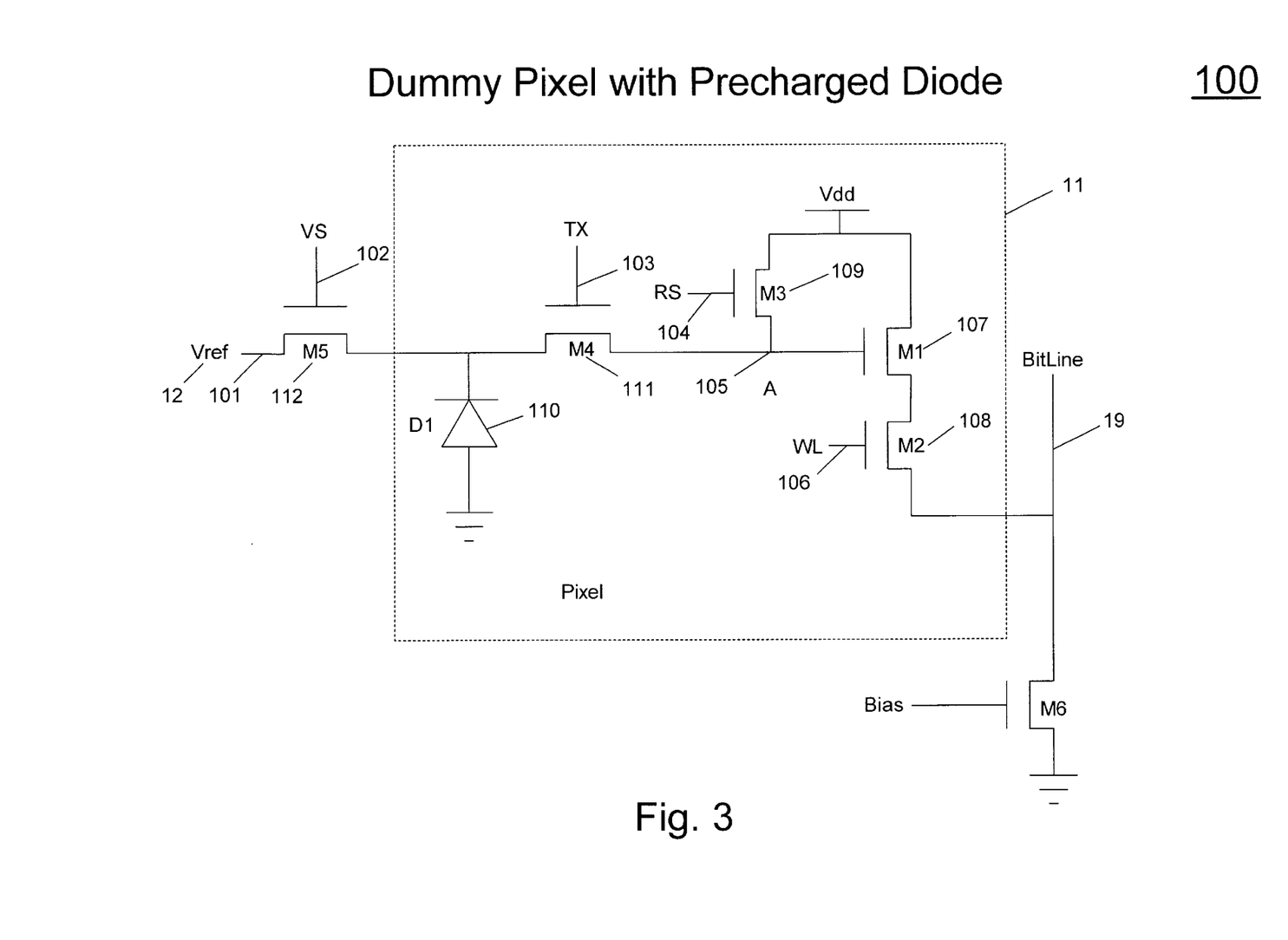
FIG. 3 is a more detailed circuit schematic diagram of one embodiment of a calibration pixel circuitry of FIG. 1 in accordance to the principles of this invention.

FIG. 3 illustrates a more detailed circuit schematic of one embodiment of a calibration pixel 14 of FIG. 1. In this embodiment, calibration pixel 100 comprises a transistor 112 (M5) coupled to a typical sensor pixel circuitry, such as the pixel circuitry 11. Voltage stimulus Vref is provided as input to each calibration cell 100 at signal port 101 of M5. Once a particular calibration pixel 100 is selected via signal Vs at port 102, data corresponding to detected Vref value at input to pixel 11 is "written", or stored, at diode 110. Then when transistor 111 (M4) is activated by enable signal TX at gate 103, Vref data stored at diode 110 is then transmitted to node A and read out via bit line 19 when transistor 108 (M2) is activated by WL select signal at gate 106. Calibration cell 100 is also illustrated with reference to the timing illustration of FIG. 4 depicting the previously described signals for pixel circuit 300.

Figure 4:
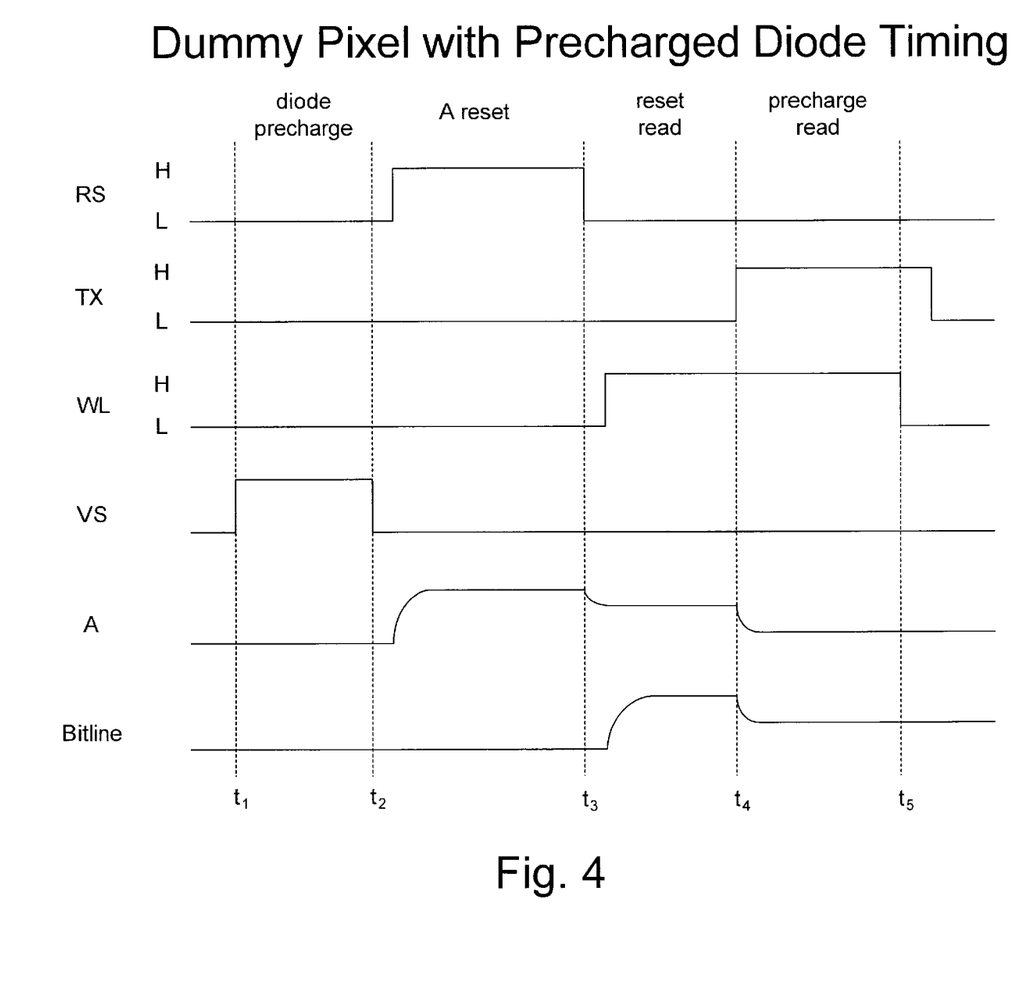
FIG. 4 shows a sample timing illustration of the signals provided with the pixel circuitry of FIG. 3.

FIG. 4 shows a sample timing illustration and operation of the signals provided with the pixel circuitry of FIG. 3. As discussed previously above for FIG. 3, signal Vs at gate 102 of transistor 112 (M5) selects and initiates the calibration process for a particular pixel 100. In this example, assuming all relevant signals described as follow are active HIGH, for example, corresponding to a voltage value associated with a digital value of "1", then while Vs is activated between time t1 and t2, diode 110 (D1) is charged with $V_{ref}$ value applied at port 101. When RS signal is activated between t2 and t3, node A charges up to value of [Vdd−Vgs3], where Vgs3 is the gate-to-source voltage of transistor M3. Upon activation of signal WL between t3 and t4, node A value is available to read out at output bit line 19 as a first data value. Upon activation of signal TX at t4, value of Vref from diode D1 is transmitted to node A and with WL still active, a second data value in response to application of Vref at node A is available to read out at bit line 19 during t4.

Figure 5:
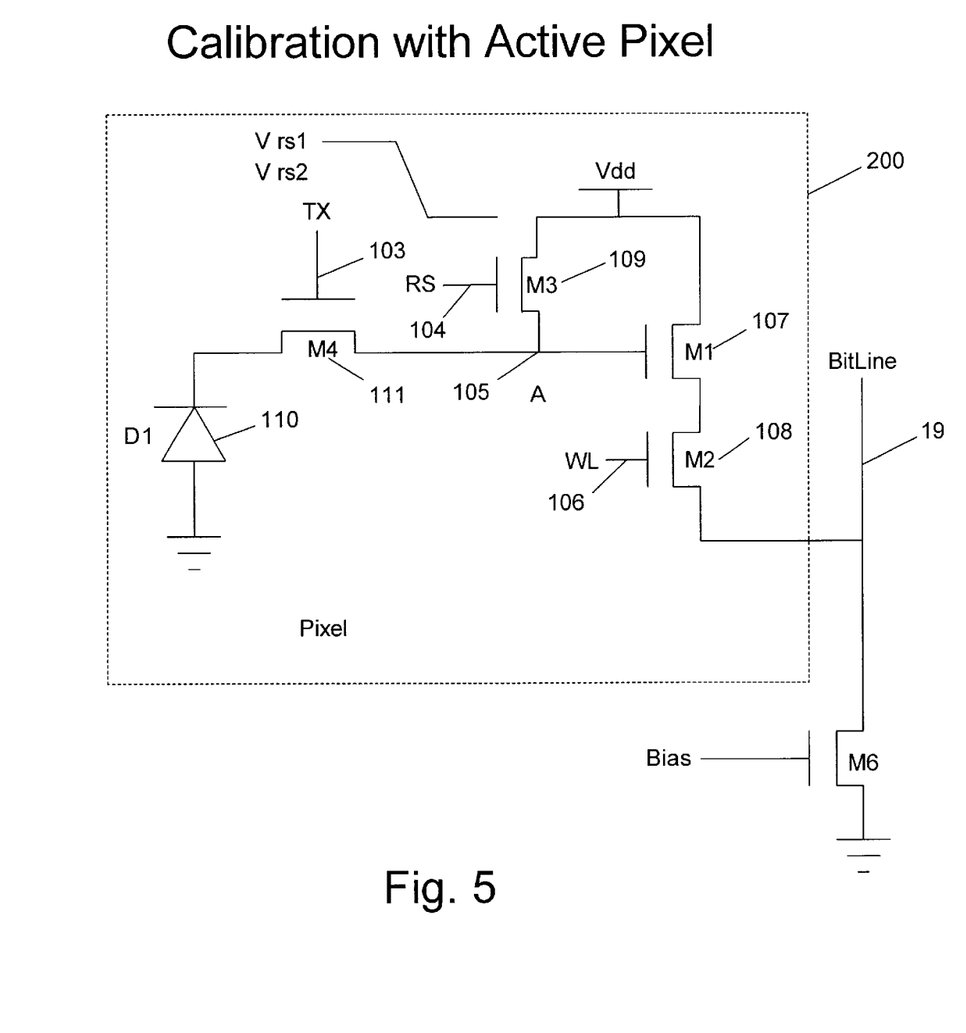
FIG. 5 illustrates an alternative embodiment of a calibration pixel circuitry of FIG. 1.
Figure 6:
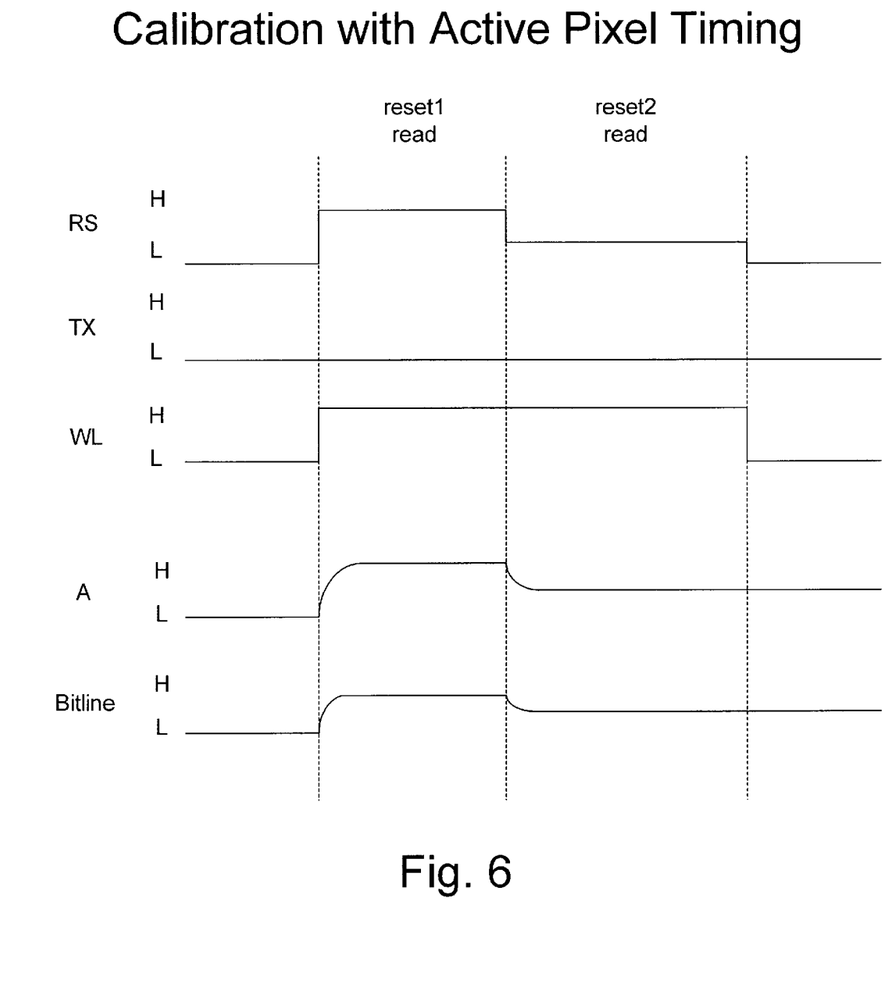
FIG. 6 shows a sample timing illustration of the signals provided with the pixel circuitry of FIG. 5.

FIG. 5 illustrates an alternative embodiment of pixel circuitry of FIG. 1. In this embodiment, a reference voltage signal is provided by signal RS that is switched during calibration between a first voltage value (Vrs1) and then a second voltage value (Vrs2) at gate 104 of transistor 109 (M3). As signal WL is activated by first voltage value Vrs1 at gate 106 of transistor 108 (M2), the first data value is read from bit line 19, while a second data value is read from bit line 19 when the second voltage signal (Vrs2) is subsequently applied. Consequently, the two data values read in response to the application of voltages Vrs1 and Vrs2 are used to generate an offset value and a gain error value for that bit line. Once the two data values are read from each bit line, the generation of calibration data is similar to as described above for FIG. 1 and. Thus, calibration data for each bit line is computed by first generating a reference offset and a reference gain error value by averaging the offset values and averaging the gain error values read from each bit line. Calibration data then comprises computing the offset difference and offset gain error as also previously discussed above in FIG. 2. As further illustrated, FIG. 6 shows a sample relative timing and operations of the signals described for pixel circuitry 200 of FIG. 5.

Figure 7:
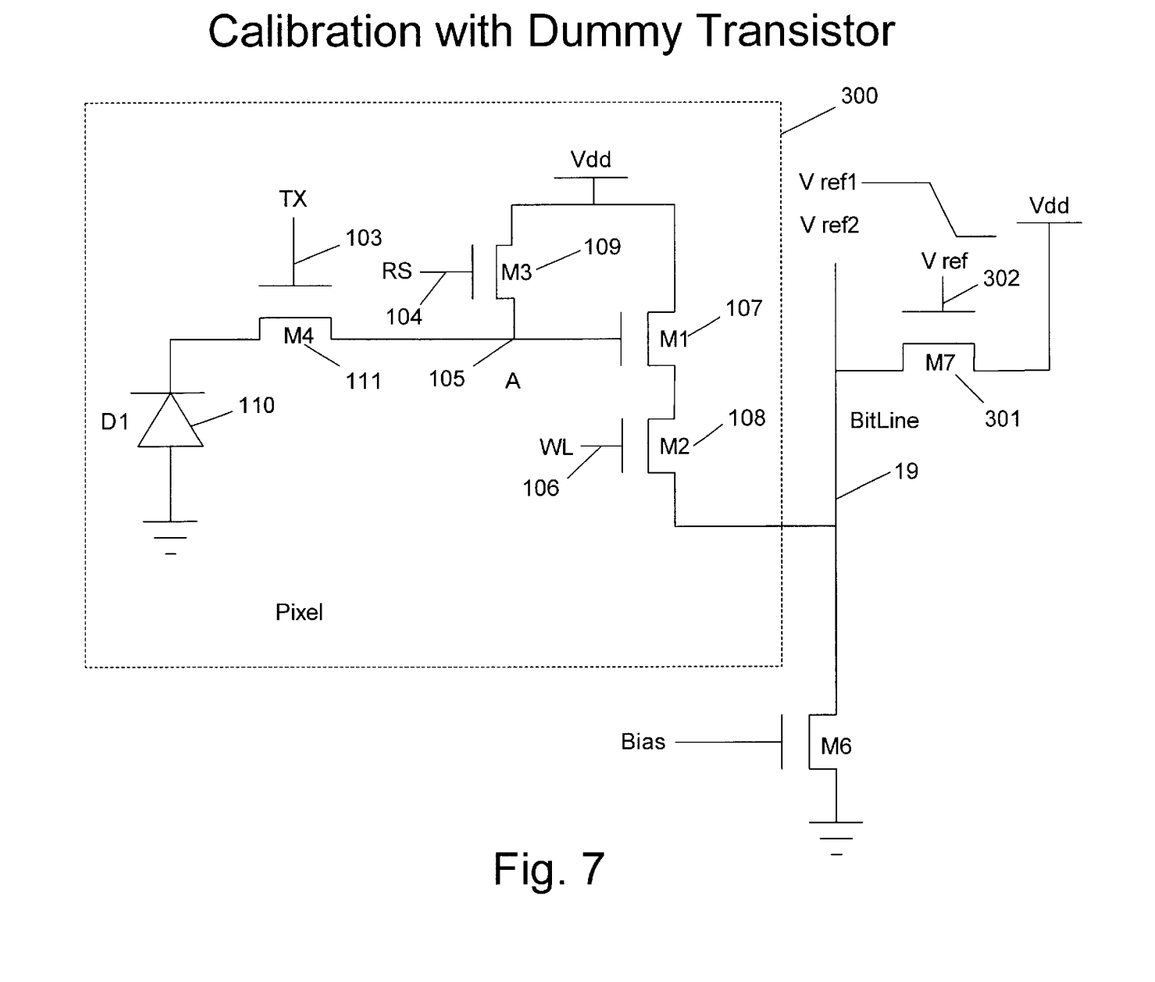
FIG. 7 illustrates yet another embodiment of a calibration pixel circuitry of FIG. 1.
Figure 8:
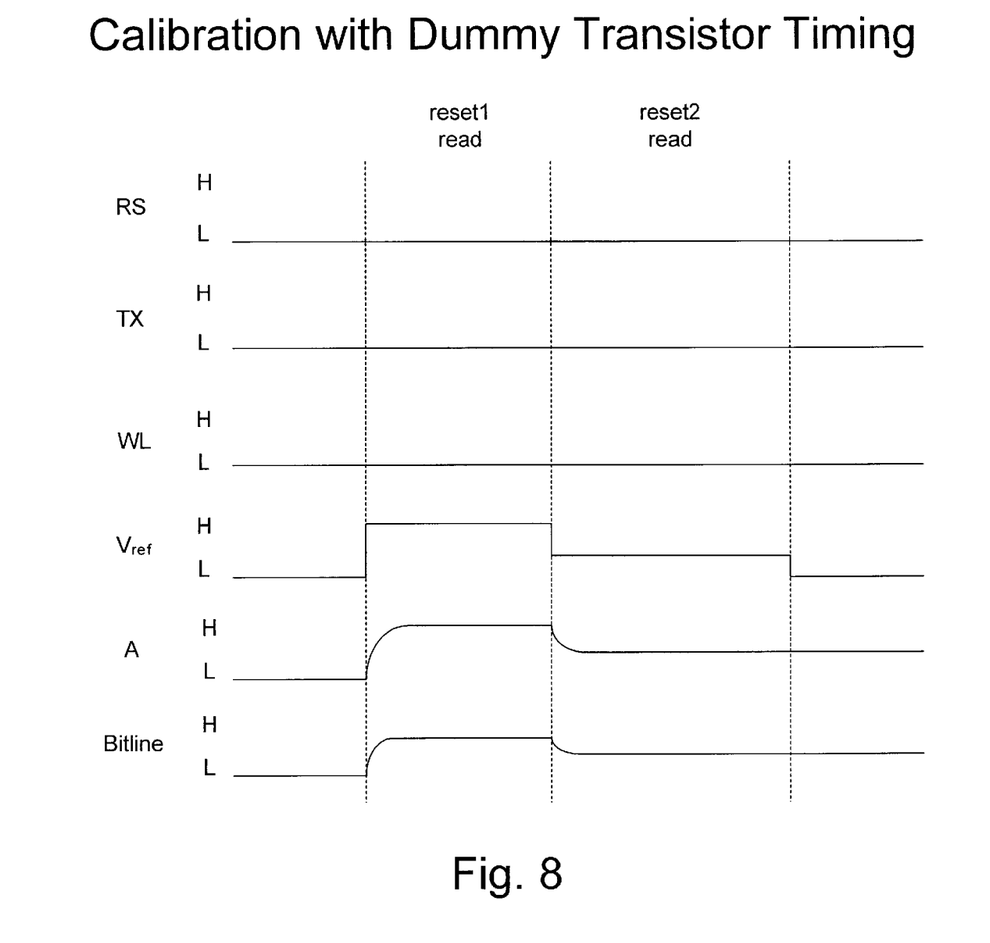
FIG. 8 shows a sample timing illustration of the signals provided with the pixel circuitry of FIG. 7.

FIG. 7 illustrates yet another embodiment of pixel circuitry of FIG. 1. In pixel circuitry 300, a dummy calibration transistor 301 (M7) is provided and coupled to each bit line 19. An uniform reference voltage signal (Vref) is applied to transistor M7 at gate 302. Vref is switched during calibration between a first voltage value Vref1 and a second voltage value Vref2. Similar to the embodiment of FIG. 5, two data values are then read out from each bit line 19 in response to the application of first Vref1 and then in response to Vref2. The two data values for each bit line are then used to generate the calibration data in a manner as described above for FIGS. 1, 2, 3 and 5. FIG. 8 illustrates a sample relative timing and operation of the previously described signals for pixel circuitry 300 of FIG. 7.

Accordingly, the calibration process thus can be invoked at every power-on of the sensor chip, or at the user's request for calibration. This enables the calibration without a light source. Moreover, since calibration can be performed each time prior to the sensor device operation, the calibration data can be stored in volatile memory, and non-volatile memory is not required. This enables single chip integration of the whole calibration process, and consequently it reduces the cost of the imager system.

The foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks.

Moreover, other variations and embodiments are possible in light of above teachings, and it is thus intended that the scope of invention not be limited by this Detailed Description, but rather by Claims following.

We claim:

1. A fixed pattern noise (FPN) calibration and correction method comprising:

applying a first voltage signal to a plurality of calibration pixels, with each calibration pixel coupled to a bit line, and each bit line also coupled to an array of pixel circuits in a sensor matrix;

reading a first and a second data value from each bit line, and generating a corresponding offset value and a gain error value from the first and the second data value for each bit line;

computing a reference offset and a reference gain error, the reference offset comprising averaging the offset values for every bit line, the reference gain error comprising averaging the gain errors for every bit line; and generating a calibration data for every calibration pixel, the step of generating calibration data comprising computing for each bit line an offset difference and a gain error difference and storing the offset difference and the gain error difference in memory.

2. The fixed pattern noise (FPN) calibration and correction method of claim 1 wherein the voltage signal applied to the plurality of calibration pixels is switched between a first voltage value and a second voltage value.

3. The FPN calibration method of claim 1 further comprising storing the output calibration data in a volatile memory device.

4. The FPN calibration method of claim 1 further comprising adding the calibration data back to a pixel output signal.

5. An on-chip FPN calibration and correction sensor architecture comprising:

a sensor matrix comprising a set of pixel arrays, each pixel array coupled to an associated bit line;

a plurality of calibration pixels circuits, each calibration pixel circuit coupled to receive an input reference voltage signal and also coupled to one of the associated bit lines;

an array of ADC circuits, wherein each ADC circuit is coupled to read a set of plurality of data values from one of the associated bit lines;

a memory storage for storing data, the memory storage coupled to the array of ADC circuits to store the plurality of bit line data values; and a correction logic circuit, the correction logic circuit coupled to the memory storage to receive the plurality of bit line data values and generating as output a set of calibration data;

wherein a calibration data value in the set of calibration data comprises a difference between a bit line data value in the plurality of bit line data values and an average of the plurality of bit line data values.

6. The on-chip FPN calibration and correction sensor architecture of claim 5 wherein each calibration pixel comprises a standard pixel circuit.

7. The on-chip FPN calibration and correction sensor architecture of claim 5 wherein each calibration pixel comprises a transistor coupled in series to a standard pixel circuit.

8. The on-chip FPN calibration and correction sensor architecture of claim 6 wherein the reference voltage signal applied to the input of each calibration pixel is switched between a first reference voltage value and a second reference voltage value.

9. The on-chip FPN calibration and correction sensor architecture of claim 5 wherein each calibration pixel comprises a transistor coupled to the associated bit line.

10. The on-chip FPN calibration and correction sensor architecture of claim 9 wherein the reference voltage signal applied to the input of each calibration pixel is switched between a first reference voltage value and a second reference voltage value.

* * * * *